United States Patent [19]

Kasper

[11] Patent Number: 5,510,692
[45] Date of Patent: Apr. 23, 1996

[54] FERRORESONANT BATTERY CHARGER WITH CONSTANT CURRENT FINISH RATE

[75] Inventor: George Kasper, Schaumburg, Ill.

[73] Assignee: LaMarche Manufacturing Company, Des Plaines, Ill.

[21] Appl. No.: 141,135

[22] Filed: Oct. 22, 1993

[51] Int. Cl.$^6$ .............................. H01M 10/46; G05F 3/06
[52] U.S. Cl. ................................. 320/23; 323/308
[58] Field of Search ............................... 320/23; 323/247, 323/248, 306, 308, 309, 340, 342; 363/20, 84, 90

[56] References Cited

U.S. PATENT DOCUMENTS 4,030,025  6/1977  Kakalec .................................. 323/61

OTHER PUBLICATIONS

Harry P. Hart & Robert J. Kakalec, A New Feedback–Controlled Ferroresonant Regulator Employing A Unique Magnetic Component, IEEE Transactions on Magnetics, vol. 1 MAG–7, No. 3, p. 571, Sep. 1971.

*Primary Examiner*—Peter S. Wong
*Assistant Examiner*—Patrick B. Law
*Attorney, Agent, or Firm*—Emrich & Dithmar

[57] ABSTRACT

Feedback and associated electronic control circuitry are eliminated in a battery charger incorporating a ferroresonant transformer for providing a constant current to a charging battery as typically required such as during the final hours of charging. The ferroresonant transformer includes an input primary winding, an output secondary winding, and a regulating winding in combination with a tuned reactor for maintaining transformer minimum output current constant, the precise value of which can be established by transformer and tuned reactor values as well as the value of a resonating capacitor. As the battery approaches full charge and the charger's current approaches minimum value, the charger's output voltage automatically is adjusted to maintain the selected current. The battery's state of charge which dictates the load on the charger changes the amount of energy flowing in the tuned reactor and regulating winding. As more energy is shifted to the regulating winding, the output voltage rises and vice versa. This change in voltage regulates the output current to the battery.

12 Claims, 4 Drawing Sheets

FERRORESONANT BATTERY CHARGER WITH CONSTANT CURRENT FINISH RATE

FIELD OF THE INVENTION

This invention relates generally to the charging of a storage battery and is particularly directed to a battery charger with a constant current finish rate.

BACKGROUND OF THE INVENTION

Many batteries require a charge curve which provides a region of constant current output during the final hours of charging. This constant current, usually approximately 2–5 amps/100 amp hours of battery capacity, is provided by raising or lowering the output voltage of the charger to maintain the desired current. Regulating the output voltage is frequently accomplished by means of a feedback control circuit which incorporates conventional electronic components such as a silicon controlled rectifier (SCR), a magnetic amplifier, transistors, and possibly a microprocessor, for providing a constant voltage or constant current at the output. The control circuit constantly monitors the output voltage and output current and provides correction to make the charger perform in accordance with a given reference output curve.

Other types of battery chargers incorporate a ferroresonant battery charging circuit employing only a ferroresonant transformer and diode rectifiers to produce the DC output. Referring to FIG. 1, there is shown in simplified schematic diagram form a prior art battery charger 10 incorporating a ferroresonant transformer 12. An AC input is provided via input terminals 16a and 16b to a primary winding 22 (which is shown as two windings in the figure) of the ferroresonant transformer 12. The ferroresonant transformer 12 further includes a magnetic core 24 as well as a secondary output winding 26 which is also shown as two separate windings. The secondary output winding 26 provides a DC output to terminals 50a and 50b via first and second rectifying silicon diodes 32 and 34 and a DC fuse 36. Also provided in the DC output circuit is a surge protector 30 and an ammeter 38 with shunt. The DC output terminals 50a and 50b are adapted for connection to a storage battery 14 (shown in dotted-line form) for the charging thereof. Transformer 12 further includes a resonating winding 28 in circuit with a resonating capacitor 54. A set of magnetic shunts 52 separates magnetic paths of the secondary winding 26 and the resonating winding 28 from the magnetic path of the transformer's primary winding 22 on the magnetic core 24. The combination of the resonating winding 28 and resonating capacitor 54 functions to regulate the output current at a constant value. When the value decreases to a small portion of the rated current of the transformer, the output voltage increases limiting regulation of the output current at low values by transformer 12. Battery charger 10 further includes a timer circuit 40 including a control transformer 42, a time clock 44, a switch 46 and an input contactor 48. Timer circuit 40 is coupled between the first and second pairs of AC input terminals 16a and 16b and AC contactors 18 and 20. Time clock 44 is set and begins counting when a battery 14 is connected to DC output terminals 50a and 50b and switch 46 is closed. When time clock 44 times-out after a predetermined time interval, switch 46 opens turning off the battery charger 10 by electrically decoupling the AC contactors 18 and 20 from the AC input terminals 16a and 16b. Timer circuit 40 thus controls the length of time that battery charger 10 is on.

Although prior art ferroresonant battery chargers do not have the complexity and associated costs of feedback-type battery charges, they are not without limitations. The characteristics of the output voltage and current curves are determined by the charger's ferroresonant transformer design. A ferroresonant transformer has an inherent current limit for regulation. At currents lower than this inherent limit, the output voltage undergoes a corresponding increase and low current regulation is limited. Charging a battery with a finish current which is not precisely regulated uses more electrolyte and decreases battery lifetime. In addition, the inability to regulate at low finishing currents makes the battery charger unsuitable for charging batteries with low or high specific gravity using the same charger and batteries which are subjected to hot or cold charging environments where the battery terminal voltages required to charge the battery change with temperature.

The present invention addresses the aforementioned limitations of the prior art by providing a battery charger with a ferroresonant transformer which is capable of providing a precisely regulated output current even at the low end limit of the charger such as during the final hours of charging when currents typically on the order of 5% of the rated output current are required.

OBJECTS AND SUMMARY OF THE INVENTION

Accordingly, it is an object of the present invention to provide an improved battery charger which provides a constant current as the battery approaches full charge without the use of a feedback control circuit.

It is another object of the present invention to provide a battery charger which charges a battery in a manner which uses less electrolyte and increases battery life without employing expensive and complicated charging control circuitry.

Yet another object of the present invention is to provide a ferroresonant transformer capable of maintaining a minimum output current constant without employing a feedback control circuit.

These objects of the present invention are achieved and the disadvantages of the prior art are eliminated by a ferroresonant transformer for providing an output to a load, wherein the load varies from an initial value to a final value, the transformer comprising: a primary winding for receiving an AC input; a secondary winding magnetically coupled to the primary winding and responsive to a current therein for providing the output to the load; a resonating winding magnetically coupled to the primary and secondary windings for changing the voltage of the output in regulating the current of the output between the initial and final values; and a tuned circuit including a regulating winding magnetically coupled to the secondary winding and a tuned reactor, wherein the regulating winding and the tuned reactor are in circuit with the resonating winding, for regulating the current of the output at the final value.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
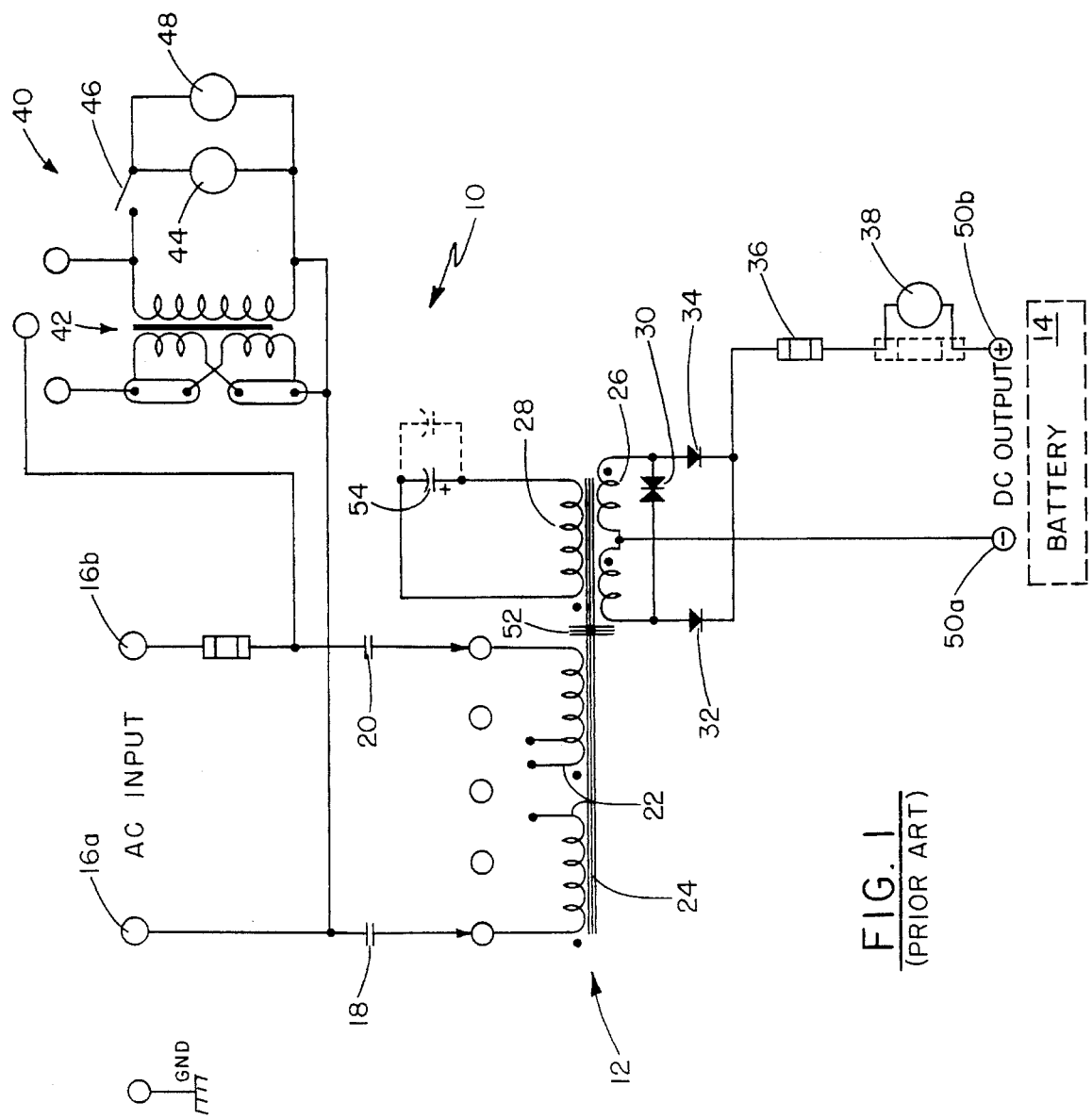
FIG. 1 is a simplified schematic diagram of a prior art battery charger incorporating a ferroresonant transformer.
Figure 2:
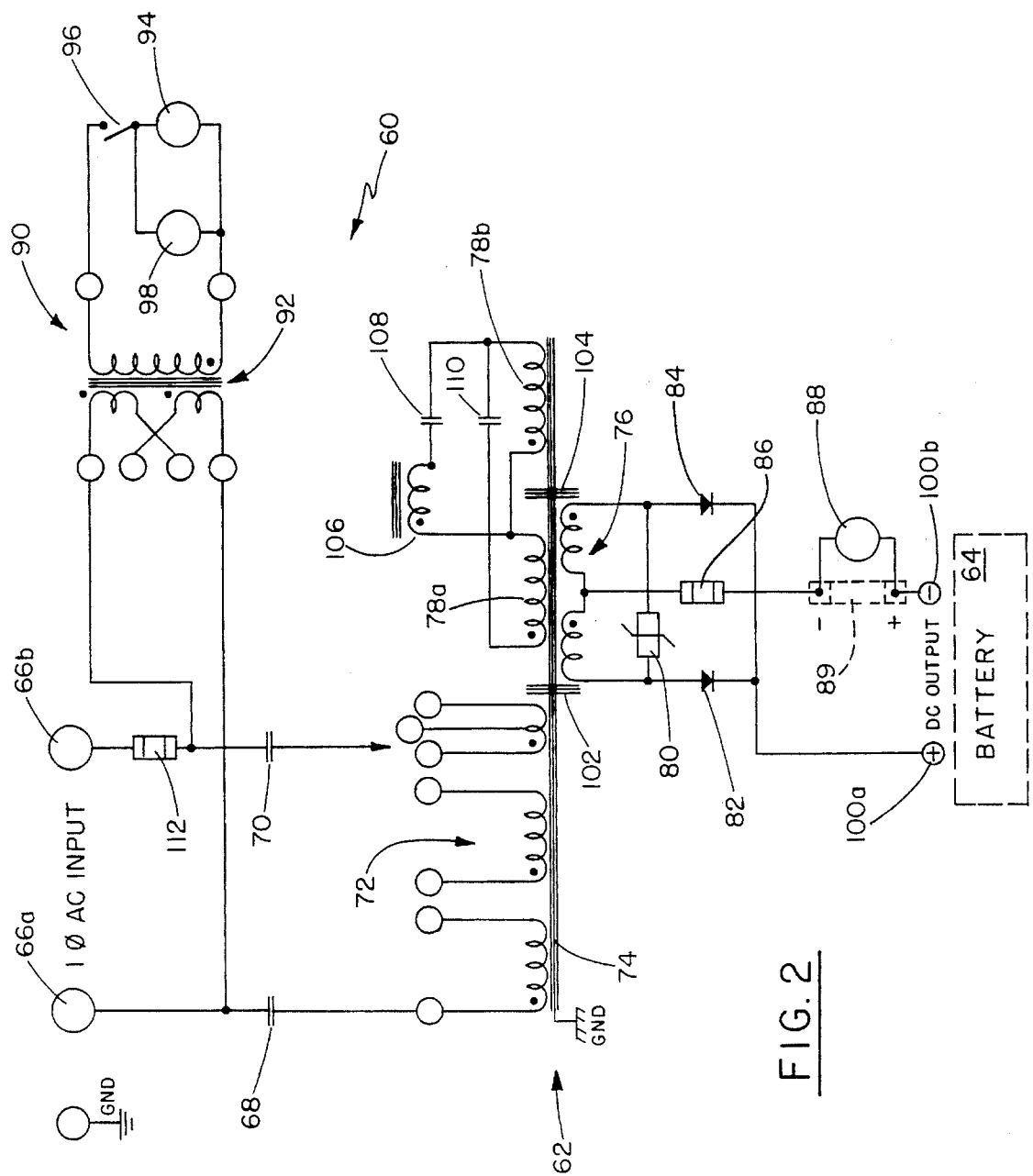
FIG. 2 is a simplified schematic diagram of one embodiment of a single phase battery charger incorporating a ferroresonant transformer in accordance with the present invention.

Referring to FIG. 2, there is shown a simplified schematic diagram of a battery charger 60 incorporating a ferroresonant transformer 62 in accordance with the present invention. An AC input is provided via input terminals 66a and 66b to a primary winding 72 of the ferroresonant transformer 62. In the figure, primary winding 72 is shown as three separate windings. Ferroresonant transformer 62 further includes a magnetic core 74 and a secondary winding 76, shown in the figure as two separate windings. Also disposed on the secondary side of transformer 62 are coupled resonating and regulating windings 78a and 78b. The magnetic path of the primary winding 72 is separated from the magnetic paths of secondary winding 76 and resonating winding 78a by means of a first set of magnetic shunts 102. Similarly, the magnetic path of regulating winding 78b is separated from the magnetic paths of secondary winding 76 and resonating winding 78a by means of a second set of magnetic shunts 104. The AC input is provided from input terminals 66a and 66b to primary winding 72 via an AC fuse 112 and first and second sets of AC contacts, or relays, 68 and 70.

On the output side of ferroresonant transformer 62, the combination of a surge protector 80, a DC fuse 86, and first and second silicon diodes 82 and 84 are coupled to secondary winding 76. Surge protector 80 protects silicon diodes 82 and 84 from large spikes in the AC input provided to the battery charger. The first and second silicon diodes 82, 84 provide a rectified output to first and second DC output terminals 100a and 100b. DC output terminals 100a, 100b are adapted for coupling to storage battery 64 for the charging thereof. Battery charger 60 further includes an ammeter 88 coupled in circuit across a shunt 89.

Battery charger 60 further includes a timer circuit 90 including a control transformer 92, a time clock 94, a switch 96 and an input contactor 98. Timer circuit 90 is coupled between the first AC input terminal 66a and first AC contactor 68 and between the second AC input terminal 66b and second AC contact 70. Time clock 94 is set and begins counting when battery 64 is connected to the DC output terminals 100a and 100b and switch 96 is closed. When time clock 94 times-out after a predetermined time interval, switch 96 opens turning off the battery charger 60 by electrically decoupling the first and second AC contacts 68, 70 respectively from the first and second AC input terminals 66a, 66b. Timer circuit 90 thus controls the length of time that battery charger 60 is on.

Coupled to the resonating and regulating windings 78a, 78b and forming a tuned circuit therewith is the combination of a tuned reactor, or choke, 106 and first and second capacitors 108 and 110. As battery 64 approaches the fully charged state, the output voltage of the ferroresonant transformer 62 automatically adjusts itself to maintain the selected current. The selected current is set at approximately 2–5 amps/100 amp hours of battery capacity because at this point most industrial batteries are in a charged condition beyond the gassing point where hydrogen gas is produced. The condition of battery 64 determines the load on battery charger 60 and will change the amount of energy flowing in the tuned reactor 106 and regulating winding 78b. As more energy is shifted to the regulating winding 78b as battery 64 becomes more fully charged, the output voltage rises. On the other hand, as more energy is shifted to resonating winding 78a such as during initial charging, the output voltage decreases. This change in output voltage regulates the output current provided to battery 64 by ferroresonant transformer 62. The precise value of the finishing constant current is determined by the values of tuned reactor 106 and resonating capacitors 108 and 110. As the output voltage increases, the ferroresonant transformer 62 of the present invention provides precise output current regulation particularly at finishing currents when battery 64 has been essentially fully charged.

Figure 3:
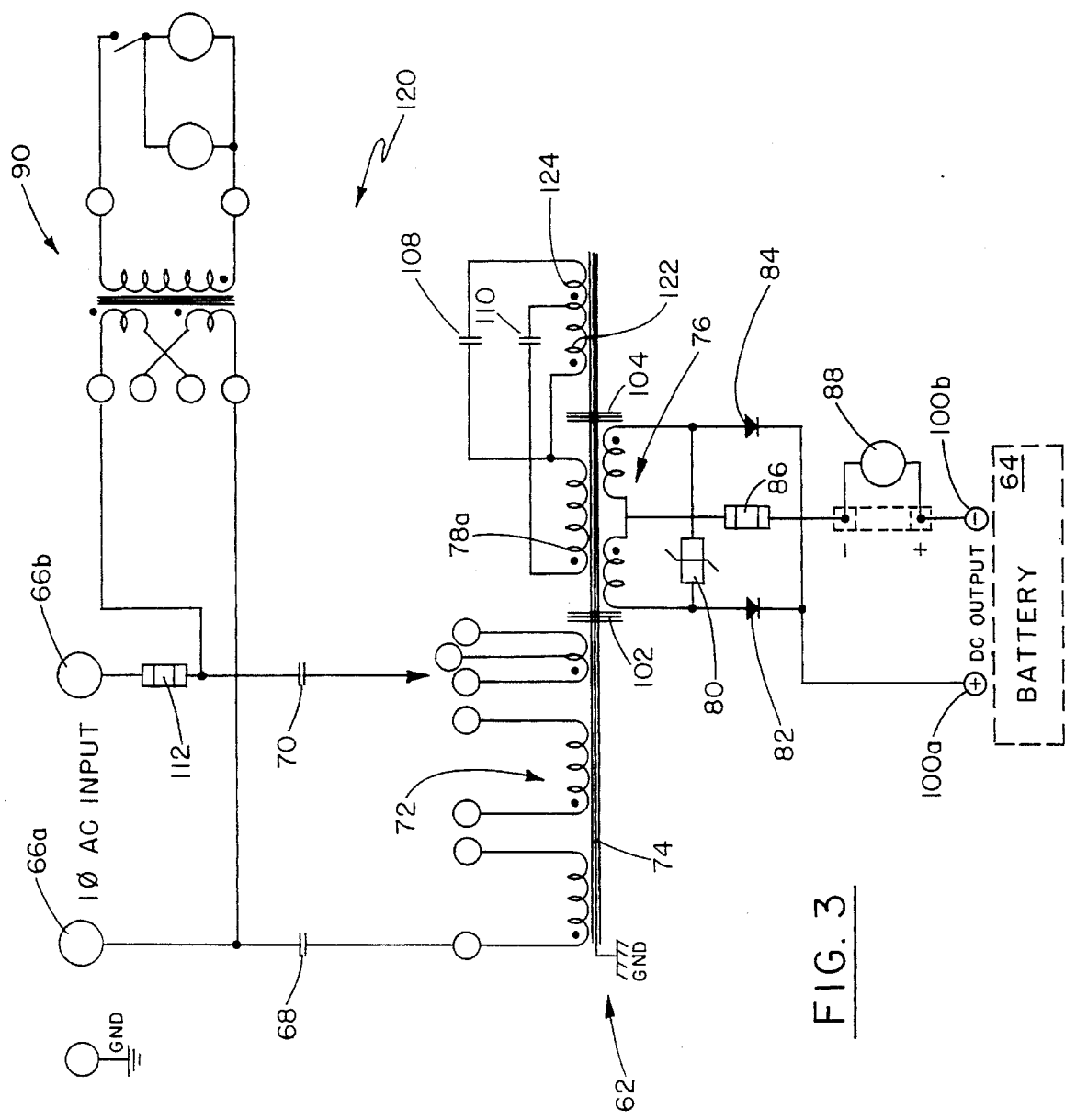
FIG. 3 is a simplified schematic diagram of another embodiment of a single phase ferroresonant battery charger in accordance with the present invention.

Referring to FIG. 3, there is shown another embodiment of a single-phase battery charger 120 in accordance with the present invention. Common numbers have been used in FIG. 3 to identify like elements in the embodiment of FIG. 2 performing substantially the same function in substantially the same manner to achieve the same end result. Thus, the discussion above relative to the detailed operation of the battery charger 60 shown in FIG. 2 and its various components applies equally as well to the battery charger 120 shown in FIG. 3 and its components. The discussion of the battery charger 120 shown in FIG. 3 is limited to differences between that embodiment and the embodiment of the present invention shown in FIG. 2. The embodiment shown in FIG. 3 differs from that shown in FIG. 2 in the arrangement of the regulating winding 122 and the tuned reactor 124. As shown in the figure, the tuned reactor 124 is formed of the same winding as the regulating winding 122, or is integrated with the regulating winding. This arrangement simplifies assembly of the battery charger 120 and reduces the number of discrete components. As in the previous embodiment, tuned capacitors 108 and 110 are coupled in circuit with resonating winding 78a and the regulating winding 122 and tuned reactor 124 combination. The embodiment of the invention shown in FIG. 3 operates in the same manner as the embodiment shown in FIG. 2 and described above.

Figure 4:
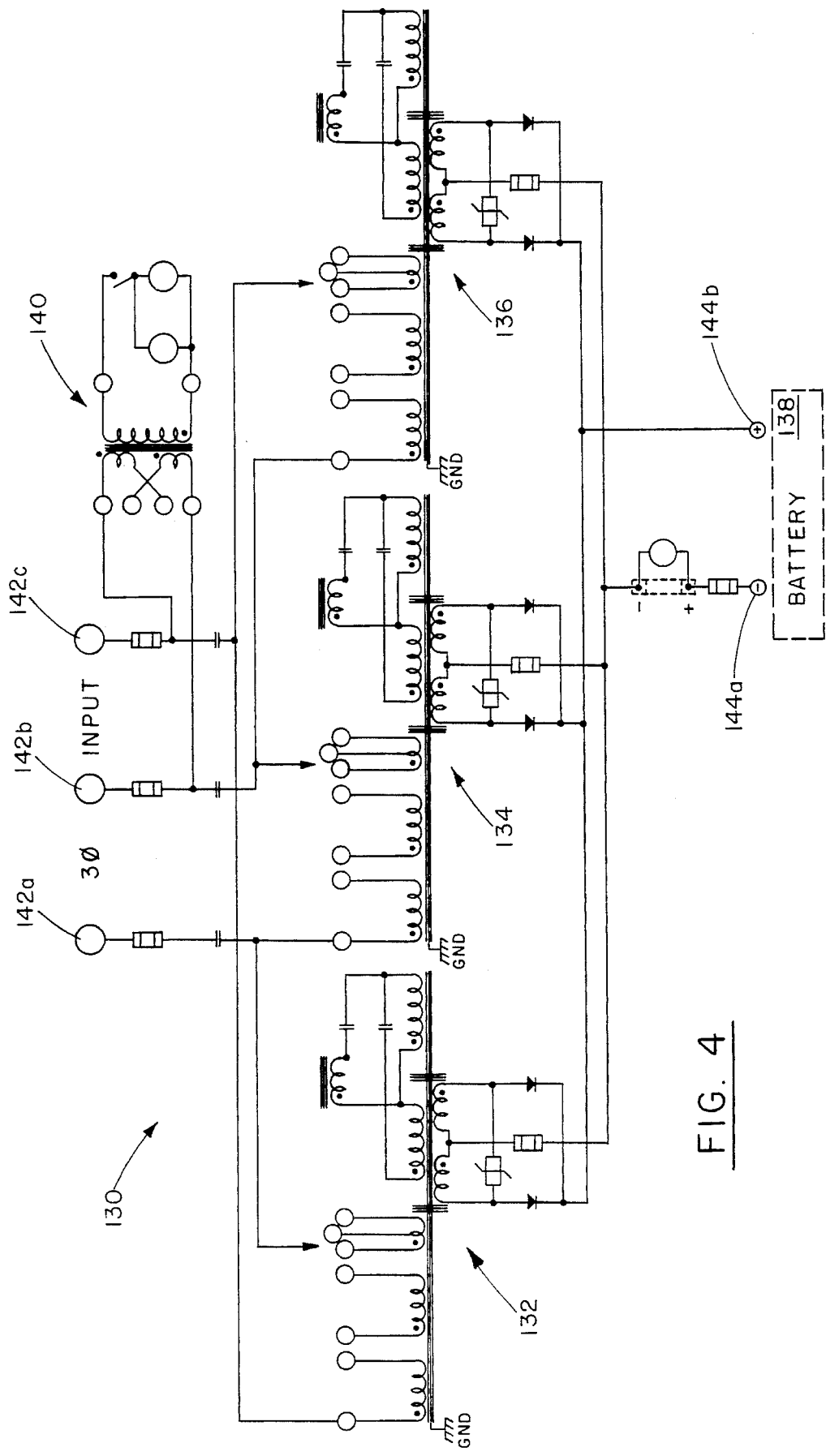
FIG. 4 is a simplified schematic diagram of a three phase battery charger incorporating three ferroresonant transformers in accordance with another embodiment of the present invention.

Referring to FIG. 4, there is shown a simplified schematic diagram of a three-phase battery charger 130 in accordance with another embodiment of the present invention. The three-phase battery charger 130 includes first, second and third ferroresonant transformers 132, 134 and 136 coupled in parallel between AC input terminals 142a, 142b and 142c and DC output terminals 144a and 144b. Each of the first, second and third ferroresonant transformers 132, 134 and 136 operates in the same manner as the ferroresonant transformers previously described and illustrated in FIGS. 2 and 3. Each ferroresonant transformer converts a respective one of the three phase inputs to a DC output for charging a battery 138. Battery charger 130 further includes a timer circuit 140 similar in operation and configuration to the timer circuits described above and shown in FIGS. 2 and 3.

There has thus been shown a battery charger incorporating a ferroresonant transformer which provides a constant current finish rate. The ferroresonant transformer includes the combination of a regulating winding and a tuned reactor in circuit with the transformer's resonating winding. As the battery approaches a fully charged state, the output voltage of the charger automatically adjusts itself to maintain a predetermined current. The predetermined current is selected based upon when the battery is fully charged and so that the charging process is beyond the gassing point where hydrogen gas is produced. As more energy is shifted to the regulating winding as the battery approaches full charge, the charger's output voltage rises and vice versa. This change in voltage regulates the output current to permit precise current regulation at low finishing current values. The ability to precisely regulate charging current finish rate makes the present invention particularly adapted for charging batteries having either high or low specific gravity which are subject to hot or cold charging environments where the battery terminal voltages required to charge change with temperature. Charging a battery with a precisely regulated finish current also uses less electrolyte and increases battery life.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A ferroresonant transformer for providing an output to a load, wherein said load varies from an initial value to a final value, said transformer comprising:

a primary winding for receiving an AC input;

a secondary winding magnetically coupled to said primary winding and responsive to a current therein for providing the output to said load;

a resonating winding magnetically coupled to said primary and secondary windings for changing the voltage of said output in regulating the current of said output between said initial and final values; and tuned circuit means including a regulating winding magnetically coupled to said secondary winding and a tuned reactor, wherein said regulating winding and said tuned reactor are in circuit with said resonating winding, for regulating the current of said output at said final value.

2. The transformer of claim 1 further comprising first shunt means for separating a magnetic path of said primary winding from a magnetic path of said secondary and resonating windings.

3. The transformer of claim 2 wherein said transformer further includes second shunt means for separating a magnetic path of said regulating winding from a magnetic path of said secondary and resonating windings.

4. The transformer of claim 1 wherein said tuned circuit further includes first and second capacitors.

5. The transformer of claim 1 wherein said tuned reactor and said regulating winding are formed from a common winding.

6. A charger for converting an AC input to a DC output for charging a storage battery, wherein said DC output goes from a high initial current to a low final current as said battery approaches full charge, said charger comprising:

a primary winding in a transformer for receiving an AC input;

a secondary winding in said transformer magnetically coupled to said primary winding and responsive to a current therein for providing an AC output;

a resonating winding in said transformer magnetically coupled to said primary and secondary windings for changing the voltage of said DC output in regulating the current of said output between said high initial current and said low final current;

tuned circuit means including a regulating winding magnetically coupled to said secondary winding and a tuned reactor, wherein said regulating winding and said tuned reactor are in circuit with said resonating winding, for regulating the current of said output at said low final current; and rectifying means coupled to said secondary winding for converting said AC output to a DC output for charging a storage battery.

7. The charger of claim 6 further comprising first shunt means for separating a magnetic path of said primary winding from a magnetic path of said secondary and resonating windings.

8. The charger of claim 7 further comprising second shunt means for separating a magnetic path of said regulating winding from a magnetic path of said secondary and resonating windings.

9. The charger of claim 6 wherein said tuned circuit further includes first and second capacitors.

10. The charger of claim 6 wherein said tuned reactor and said regulating winding are formed from a common winding.

11. The charger of claim 6 further comprising timing means for turning said charger off after a predetermined period of operation.

12. The charger of claim 11 further comprising coupling means for connecting said timing means to said primary winding for removing said AC input from said primary winding after said predetermined period of operation.

* * * * *